(12) United States Patent
Melville

(10) Patent No.: US 6,324,007 B1
(45) Date of Patent: Nov. 27, 2001

(54) SCANNED DISPLAY WITH DUAL SIGNAL FIBER TRANSMISSION

(75) Inventor: Charles D. Melville, Issaquah, WA (US)

(73) Assignee: Microvision, Inc., Bothell, WA (US)

( * ) Notice: Subject to any disclaimer, the term of this patent is extended or adjusted under 35 U.S.C. 154(b) by 0 days.

(21) Appl. No.: 09/718,196

(22) Filed: Nov. 20, 2000

Related U.S. Application Data

(63) Continuation of application No. 09/128,955, filed on Aug. 5, 1998, now Pat. No. 6,151,167.

(51) Int. Cl.[7] .................................................... G02F 1/33
(52) U.S. Cl. ............................................ 359/618; 359/629
(58) Field of Search ................................. 359/618, 629, 359/630, 202, 204, 201; 385/88

(56) References Cited

U.S. PATENT DOCUMENTS 5,596,339 * 1/1997 Furness, III et al. ................ 359/630

* cited by examiner

Primary Examiner—Hung Xuan Dang

(57) ABSTRACT

A scanning display includes a control unit and a scanning head linked by a tether. The control unit outputs two beams of orthogonally polarized light, each beam being modulated with a respective set of image information. The fiber is a polarization-maintaining fiber that receives the orthogonally polarized beams and carries them to the scanning head. At the scanning head, a birefringent material separates the beams spatially in response to their different polarizations. Vertical and horizontal scanners then scan the separated beams through a substantially raster pattern to produce an image.

15 Claims, 8 Drawing Sheets

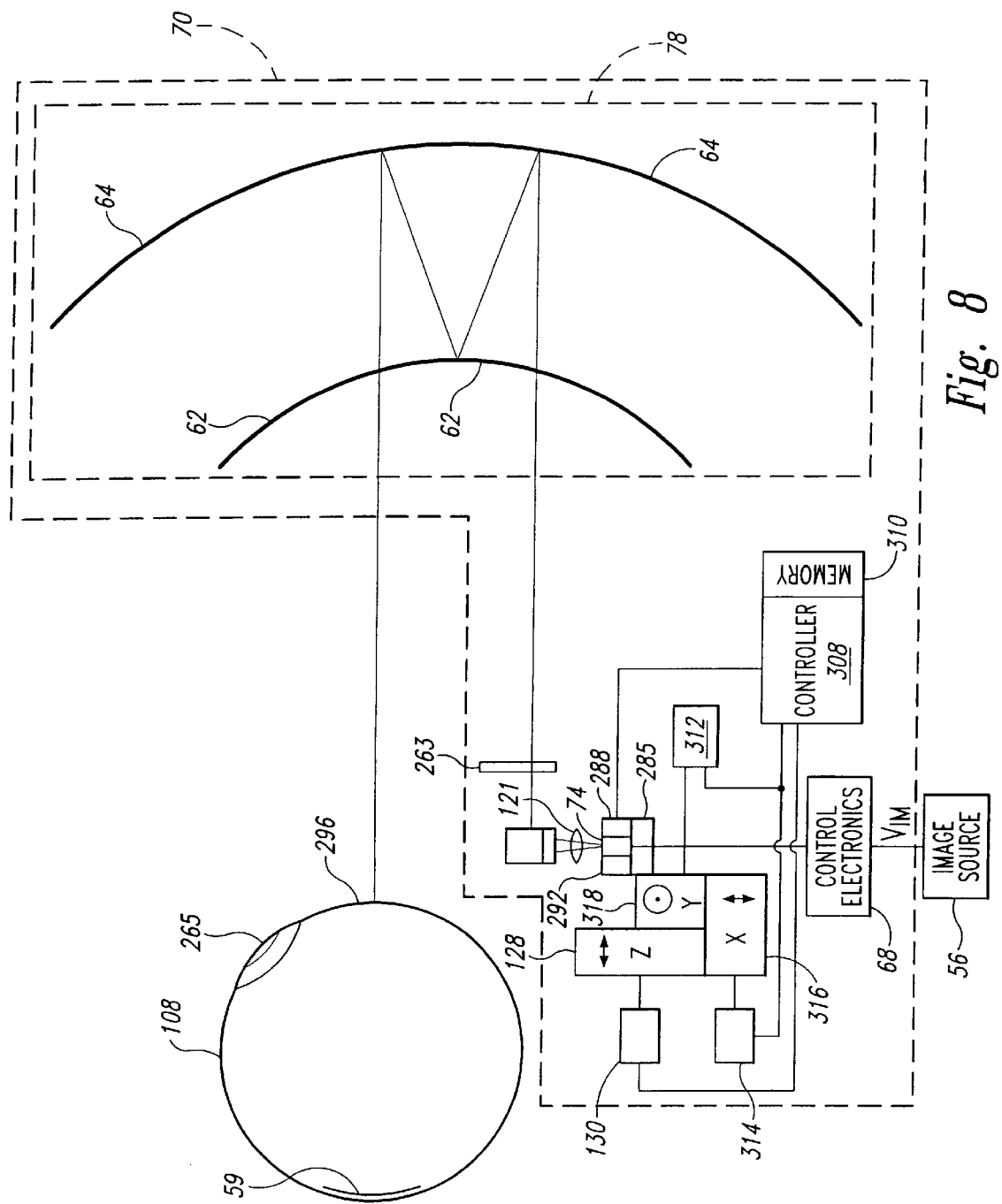

SCANNED DISPLAY WITH DUAL SIGNAL FIBER TRANSMISSION

This application is a continuation of application Ser. No. 09/128,955, filed Aug. 5, 1998 now U.S. Pat. No. 6,151,167.

TECHNICAL FIELD

The present invention relates to optical imaging systems and, more particularly, to systems employing scanning inputs or outputs.

BACKGROUND OF THE INVENTION

A variety of techniques are available for providing visual displays of graphical, textual or video images to a user. For example, cathode ray tube displays ("CRTs"), such as televisions and computer monitors, are very common. Such devices suffer from several limitations. For example, CRTs are typically bulky, consume substantial amounts of power and require high voltages, making them undesirable for portable or head-mounted applications.

Flat panel displays, such as liquid crystal displays, plasma displays, and field emission displays, may be less bulky and consume less power. However, typical flat panel displays utilize screens that are several inches across. Such screens have limited use in head mounted applications or in applications where the display is intended to occupy only a small portion of a user's field of view.

More recently, very small displays have been developed for partial or augmented view applications and for various head-mounted applications. In augmented view applications, a portion of the display is positioned in the user's field of view and presents an image that occupies a small region 42 of the user's field of view 44, as shown in FIG. 1. The user can thus see both a displayed image 46 and background information 48.

One approach to providing a small display is a scanned beam display such as that described in U.S. Pat. No. 5,596,339 to Furness, et. al., entitled "VIRTUAL RETINAL DISPLAY WITH FIBER OPTIC POINT SOURCE," which is incorporated herein by reference. In such displays, a modulated beam of light is scanned through a periodic two-dimensional pattern. The scanned light is then received by a viewer's eye. The light strikes the viewer's retina and the viewer perceives an image in response.

SUMMARY OF THE INVENTION

In an optical imaging apparatus, light from an optical source is divided into two separately polarized beams that are separately modulated and simultaneously transmitted to a scanning assembly. In one embodiment of the invention, each of the beams is modulated with respective image information. The modulated beams are then coupled into a polarization maintaining optical fiber and transmitted to a scanning assembly. The scanning assembly scans the beams through a predetermined pattern, such as a raster pattern. Then, a birefringent crystal separates the beams into their polarized components. The separated components are then transmitted to a viewer's eye or eyes along different paths. Each of the beams thus forms a separately modulated pixel of a scanned image.

In one embodiment, the optical source is a laser that emits polarized light. The polarized light is split by a beam splitter into two separate beams. Each of the beams is modulated by a respective modulator. Then, a polarization rotator rotates one of the beams so that the two beams are orthogonally polarized. The orthogonally polarized beams are then coupled into the fiber for transmission to the scanning assembly.

In one embodiment, the optical source includes three separate optical emitters that emit beams of red, green and blue light, respectively. Each of the beams is then separated by a respective beam splitter and all six of the beams are separately modulated. One of each of the red, green, and blue beams are then rotated to orthogonal polarizations relative to their unrotated counterparts. The six beams are then coupled to the fiber and transmitted to the scanning assembly, where they are separated into the orthogonally polarized components. The unrotated components are then directed along a first optical path to the viewer's eye and form a first set of color pixels. The rotated components are directed along a second optical path to the viewer's eye and form a second set of color pixels. Because both of the components can be modulated separately and transmitted simultaneously, the information represented by the two modulated components is effectively multiplexed.

BRIEF DESCRIPTION OF THE FIGURES

FIG. 8 is a diagrammatic representation of the scanning display of Fig. 7 showing movement of the eye pupil relative to the scanned beam.

DETAILED DESCRIPTION OF THE INVENTION

Figure 2:
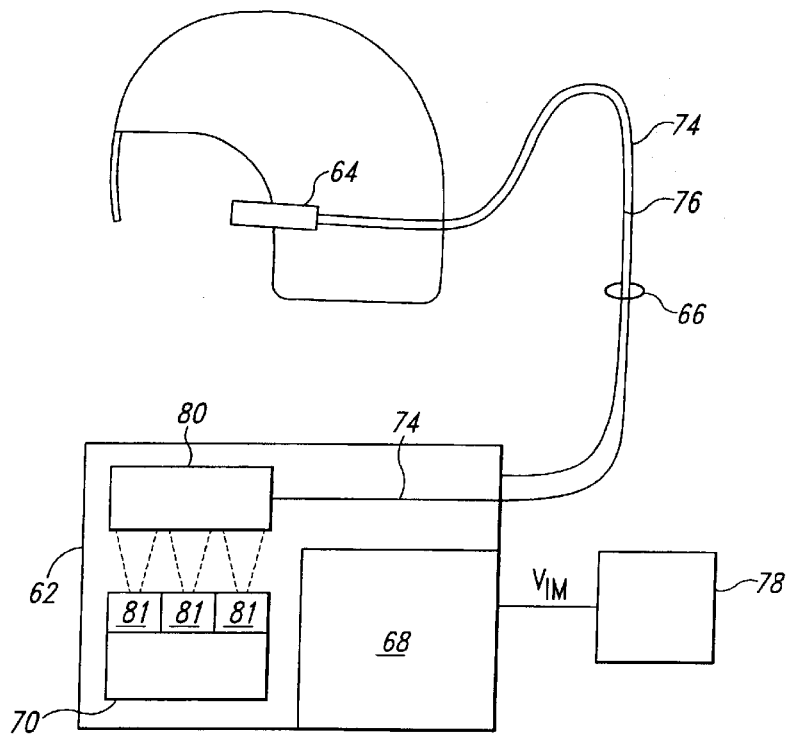
FIG. 2 shows a scanned display system according to one embodiment of the invention including light sources and control electronics coupled to a helmet mounted scan head assembly by a transmission fiber.

As shown in FIG. 2, a scanning display 40 according to the invention includes a control unit 62 and a scanning head 64 linked by a tether 66. In general, the control unit 62 receives a video signal $V_{IM}$ from an external signal source 78 and produces output signals for driving the scanning head 64. Within the control unit 62, control electronics 68 receive and decode the video signal $V_{IM}$ to identify image information, horizontal and vertical sync signals. The control electronics 68 output electrical signals in response to the extracted information to activate optical sources 70. In response, the optical sources 70 produce optical signals that are coupled a fiber 74 within the tether 66 by a coupling module 80. Before coupling to the fiber, the optical signals are encoded with the extracted information by external light modulators 81 within the optical sources 70. The fiber 74 then carries the modulated light to the scanning head 64.

In addition to controlling the optical sources, the control electronics 68 also produce electrical driving signals that are carried to the scanning head 64 by an electrical cable 76 within the tether 66. The electrical signals will be discussed in greater detail below with reference to FIG. 6.

Figure 3:
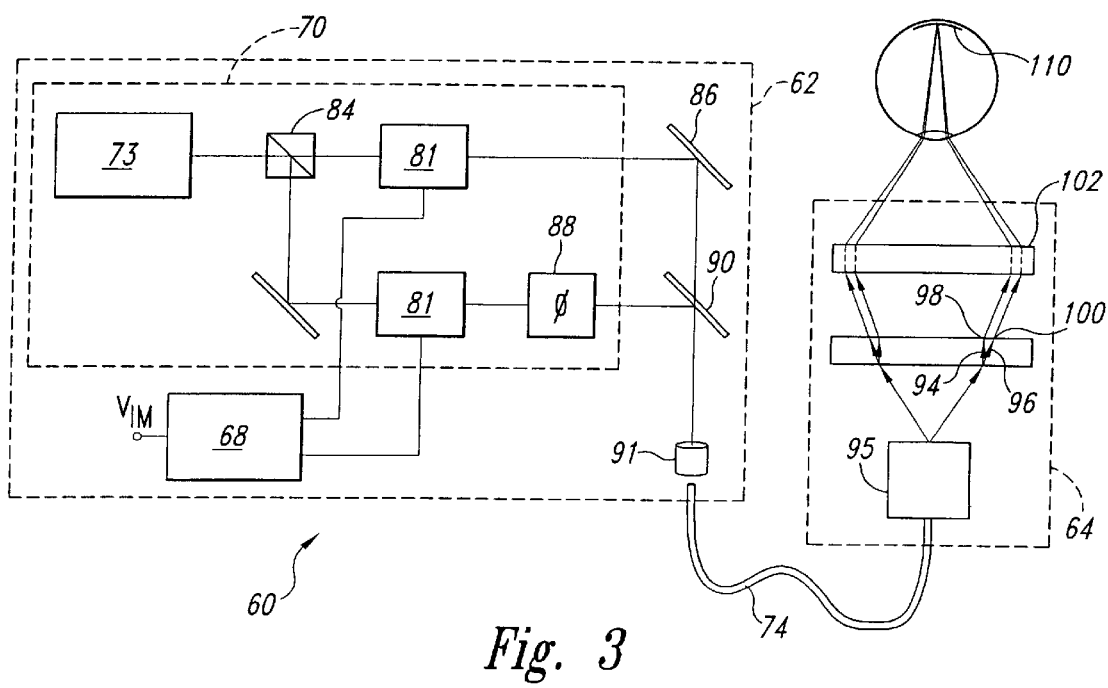
FIG. 3 is a diagrammatic representation of the display of FIG. 2 showing coupling of dual beams into the tether and separation of the dual beams at the scan head.

As best seen in FIG. 3, each of the optical sources 70 includes a light emitter 73 that emits a continuous wave beam of light. The optical source 70 also includes a beam splitter 84 that splits the emitted light into two beams. For clarity of presentation, only a single light emitter 73 is shown in FIG. 3. While such a source is appropriate for a monochrome system, one skilled in the art will recognize that a color display will typically include three emitters and corresponding beam splitters, modulators, phase shifters and beam combining optics. Returning to FIG. 3, after each of the beams leaves the beam splitter 84, it enters a respective one of the modulators 81 so that the beams can be modulated independently. As will be described below, the information in the modulated first beam corresponds to a first line of the image and the information in the modulated second beam corresponds to a second line of the image.

Upon leaving the first modulator 81, the first beam travels to a turning mirror 86 that redirects the first beam along a selected optical path. The second beam also travels to a respective turning mirror 86 and then enters a beam combiner 90 where it is directed along the same optical path as the first beam. Unlike the first beam, the second beam passes through a polarization rotator 88 before reaching the corresponding turning mirror 86. Consequently, the second beam is polarized orthogonally relative to the first beam.

The two collinear beams then enter alignment optics that 91 couple the beams into the fiber 74. Unlike conventional fiber coupled displays, in the display 60 of FIG. 3, the fiber 74 is a polarization maintaining fiber that maintains the orthogonal polarizations of the two modulated light beam during transmission from the control unit 62 to the scanning head 64.

Figure 4:
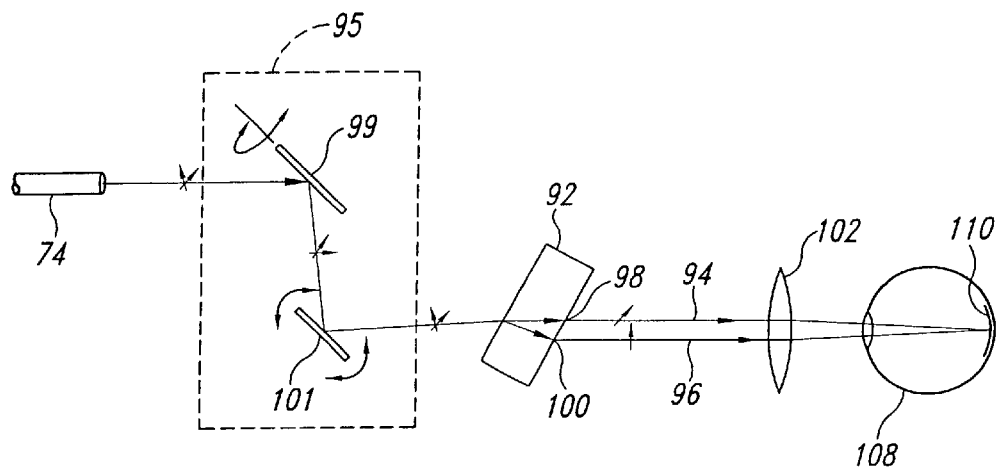
FIG. 4 is a diagrammatic display of a scan head showing separation of polarized beams from a fiber into separate, spaced apart beams.

After traveling through the fiber 74, the modulated light exits the opposite end of the fiber 74, and strikes a scanning assembly 95. As shown in FIG. 4, the scanning assembly 95 includes horizontal and vertical scanners 99, 101 that scan the light in an approximate raster pattern. Upon exiting the scanning assembly 95, the scanned light enters a birefringent crystal 92 at a slight angle. As is known, a beam striking the crystal 92 at an entry angle will be deflected to a second angle within the crystal 92 due to the difference in indices of refraction between the crystal 92 and the air. As is also known, a birefringent crystal has an index of refraction that varies according to the polarization of light passing through the crystal.

Consequently, the birefringent crystal deflects light of the first polarization along a first path and deflects light of the second polarization along a second, diverging path, as indicated by the splitting of the two rays 94, 96 in FIG. 4. Because of their differing paths, the rays 94, 96 exit the crystal 92 at vertically spaced apart locations 98, 100. Having returned to the lower index of refraction of the air, the rays 94, 96 once again become parallel. The rays 94, 96 then travel through eye coupling optics 102 where the rays are focused and shaped for viewing by a viewer's eye 108. Since the rays 94, 96 are spaced apart vertically, the light follows two separate, parallel paths upon exiting the birefringent crystal 92. The light enters the eye 108 and strikes the viewer's retina 110, and the user perceives an image in response.

Figure 5:
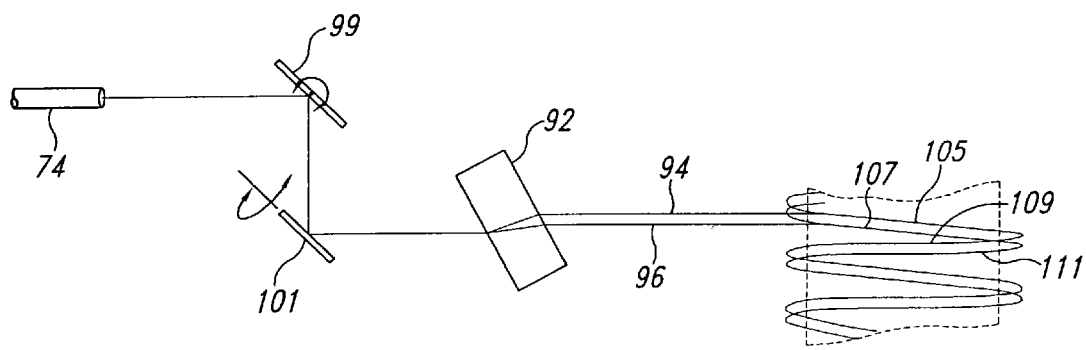
FIG. 5 is a diagrammatic representation of the scan head of FIG. 4 showing a resulting interlaced scan pattern.

According to one aspect of the invention, the light in each of the rays 94, 96 is modulated according to one line of image information so that, as the pair of parallel rays 94, 96 are scanned, the intensities of the optical beams vary according to the desired images. Thus, as the horizontal scanner 99 sweeps the beam horizontally, two horizontal lines 105, 107 of the image are formed, as represented in FIG. 5. One skilled in the art will recognize that the positions of the beams, as represented in FIG. 5, correspond to the locations of the beams in the viewer's field of view. These locations, in turn correlate to angles of incidence of the beams into the viewer's eye 108.

Upon completing the first sweep, the horizontal scanner 99 then begins a return sweep in a direction opposite the original sweep. At the same time, the vertical scanner 101 simultaneously shifts the lines' positions vertically so that the light beams will be shifted vertically during the return sweep. Rather than blanking the light sources during the return sweep, the modulators 81 once again modulate the light beams with image information, so that two additional lines 109, 111 are formed. One skilled in the art will recognize that modulators 81 will apply the image information in reverse order during the return sweep so that the lines 109, 111 will not be written in reverse order. Thus, each complete scan (forward and reverse sweep) of the horizontal scanner 99 produces four lines of image.

Figure 6:
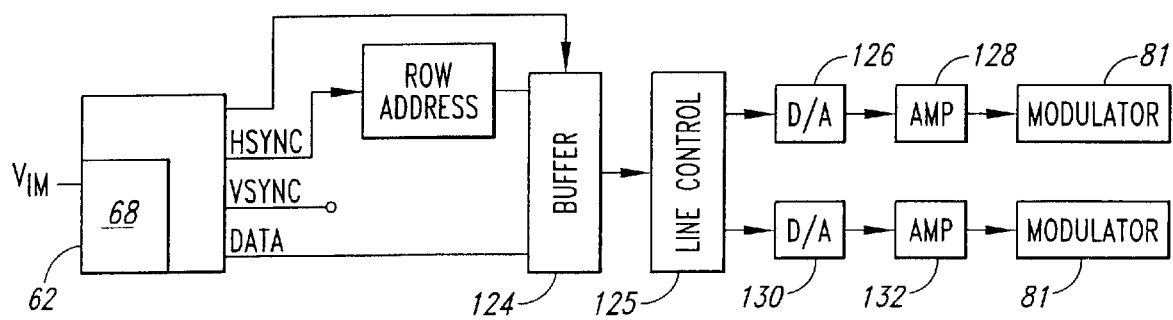
FIG. 6 is a schematic of control electronics, driving electronics and optical modulators in the display of FIG. 4.

FIG. 6 shows one approach according to the invention for providing the data as described above. When the video signal $V_{IM}$ arrives at the control unit 62, the control electronics 68 extract digital data representing lines of the image. For example, where the video signal $V_{IM}$ is analog, a conventional analog-to-digital converter can provide the digital data. Where the video signal $V_{IM}$ is digital, the digital information can be extracted directly. Additionally, the control electronics 68 extract horizontal and vertical synchronization signals HSYNC, VSYNC.

The digital image data is then segmented into groups of data, where each group contains data representing a single line of the image. Each group is stored in a row of a buffer 124 as a line of image data, responsive to the horizontal synchronization signal HSYNC. Then, at the beginning of a forward sweep of the horizontal scanner 99, a first line of image data is retrieved from the buffer 124 and provided to a first digital-to-analog (D/A) converter 126 through a line control circuit 125. The first D/A converter 126 converts the data to an analog signal that is amplified at a first amplifier 128 and applied to the first modulator 81. In response to the amplified analog signal, the first modulator 81 modulates the first light beam with the image information.

At substantially the same time that the first line of data is being retrieved, the immediately following line of image data is also retrieved and applied to a second D/A converter 130. The output of the second D/A converter 130 is then amplified by a second amplifier 132 and applied to the second modulator 81 to modulate the second beam of light. One skilled in the art will recognize that there are several approaches to retrieving the to lines of data substantially simultaneously. For example, each line of data can be prefetched from the buffer 124 and directed by a multiplexer to respective registers where the line of data is stored temporarily. Then, the register data can be clocked out of both registers simultaneously. Alternatively, the buffer 124 can be formed from two separate blocks of memory (e.g. two separate buffers) with lines of image data being written alternatively between the blocks of memory. Then, the lines of image data can be read from the two memory blocks simultaneously.

Returning to operation of the scanner 99 of FIG. 5, on the return sweep, the two lines of image data are retrieved in similar fashion, except that the data for the second line are retrieved in reverse fashion from the buffer 124. To retrieve the data in reverse fashion, the buffer 124 can be addressed in reverse order, or the data can be transferred to a register in forward fashion and read from the register in last-in-first-out (LIFO) fashion. At the end of the full scan, four lines 105, 107, 109, 111 of image data have been retrieved from the buffer 124, applied to the optical beams, and scanned onto the viewer's retina as portions of the image.

The above described process for writing four lines in a single scan is then repeated several times to write an image. For example, if the image includes 500 horizontal lines, the horizontal scanner will repeat the scan 125 times to produce the image.

In one embodiment, the image is re-written 60 times per second, which is a common refresh rate for conventional displays. Thus, the horizontal scanner scans at a rate of 7500 Hz (60*125). One skilled in the art will recognize that, by scanning two lines of information simultaneously, the rate of the horizontal scanner is reduced. For comparison, to write the 500 lines with only a single line written in each sweep (2 lines per scan), the horizontal scanner would scan at 15,000 Hz (60*(500/2)).

This reduction in scan rate eases development of the horizontal scanner 99 by providing additional freedom of design. For example, in many cases maximum scan angle and/or maximum mirror size will be reduced to increase the scan rate. In such cases, the reduced scan rate of this embodiment can allow a larger scan angle or a larger mirror size.

Figure 7:
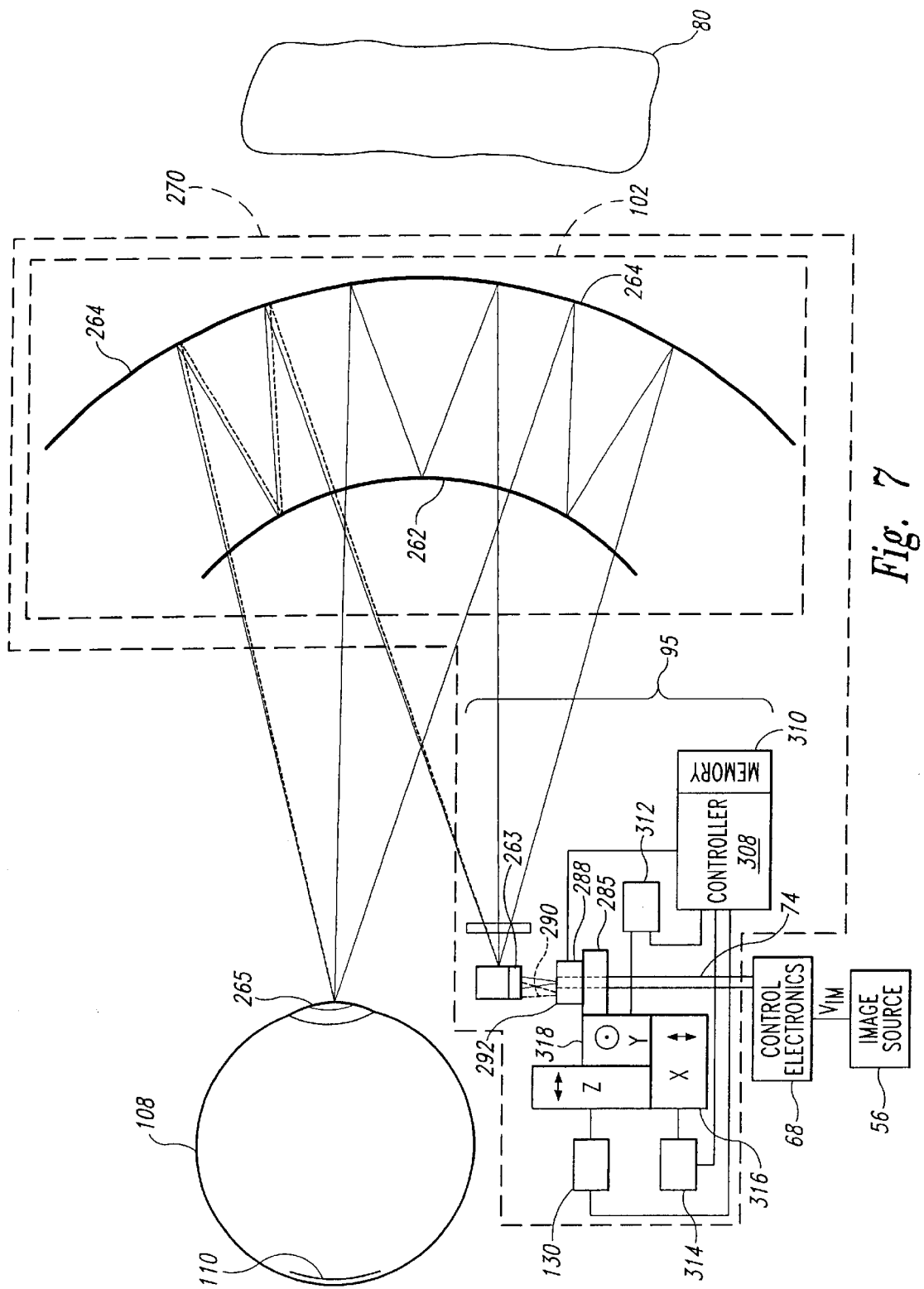
FIG. 7 is a diagrammatic representation of the scanning display of FIG. 4 where the scan head includes eye-tracking components.

One structure suitable for use as the scanning head 64, shown in FIG. 7, is positioned for viewing by a viewer's eye 108. The head 64 includes two principal portions, each of which will be described in greater detail below. The first portion of the head 64 is the scanning assembly 95 that scans the input beam through a two-dimensional scanning pattern, such as a raster pattern. One example of such a scanning assembly is a mechanically resonant scanner, such as that described U.S. Pat. No. 5,557,444 to Melville et al., entitled MINIATURE OPTICAL SCANNER FOR A TWO-AXIS SCANNING SYSTEM, which is incorporated herein by reference. However, other scanning assemblies, such as microelectromechanical or acousto-optic scanners may be used in certain applications.

The eye coupling optics 102 forms the second portion of the head 64. The eye coupling optics 102 in the embodiment of FIG. 7 include a pair of lenses 262 and 264 that shape and focus the beams appropriately for imaging or for viewing by a viewer's eye 108. In augmented view applications, the outer lens 264 is partially transmissive to allow the user to view an external environment 80.

Returning to FIG. 4, the user's eye 108 is typically in a substantially fixed location relative to the eye coupling optics 102 because the viewer's head is typically in a fixed location relative to the scanning assembly 95. For example, the scan head 64 may be rigidly mounted and include an eyecup against which the user's eye socket is pressed. For clarity, this description therefore does not discuss head movement in describing operation of the display 60. One skilled in the art will recognize that the user's head may be free for relative movement in some applications. In such applications, a known head tracking system may track the user's head position for coarse positioning.

When the user's eye 108 moves, the pupil 265 may become misaligned with light from the lens 262. In the embodiment of FIG. 7, eye tracking reduces such misalignment by monitoring the position of the user's eye 108 and adjusting the beam alignment, as will now be described with reference to FIGS. 8–11.

In addition to light from the fiber 74, the eye coupling optics 102 also receives a locator beam 290 from an infrared light source 292. Combining optics 263 that combine the infrared light from the source 292 with the light from the fiber 74 so that the infrared and visible light are substantially collinear. Thus, the output of the eye coupling optics 102 includes light from the infrared light source 292.

As shown in FIG. 8, when the user's eye 108 moves, all or a portion of the light from the fiber 74 and infrared source 292 may no longer enter the pupil 265 or may enter the pupil 265 at an orientation where the pupil 265 does not direct the light to the center of the retina 59. Instead, some of the light from the fiber 74 and source 292 strikes a non-iris portion 296 of the eye. As is known, the non-iris portion 296 of the eye has a reflectance different and typically higher than that of the pupil 265. Consequently, the non-iris portion 296 reflects light from the fiber 74 and source 292 back toward the eye coupling optics 102. The eye coupling optics 102 redirect the reflected light toward an optical detector 288 positioned on the substrate 285 adjacent to the source 292. In this embodiment, the detector 288 is a commercially available CCD array that is sensitive to infrared light. As will be described below, in some applications, other types of detectors may be desirable.

Figure 9A:
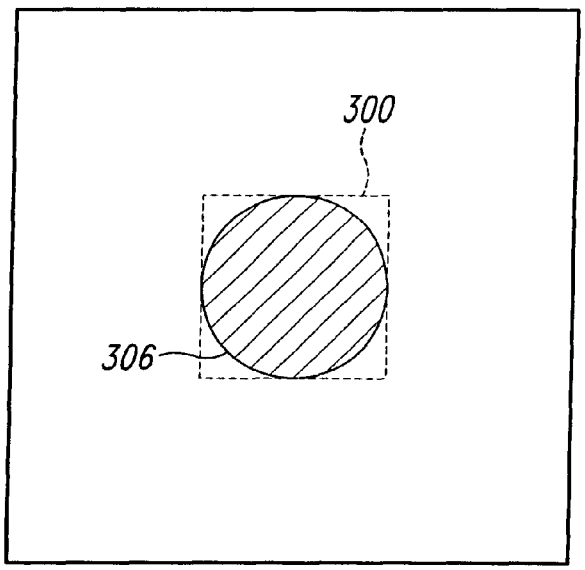
FIG. 9A is a plan a view showing alignment of a pupil shadow with a detection.
Figure 9B:
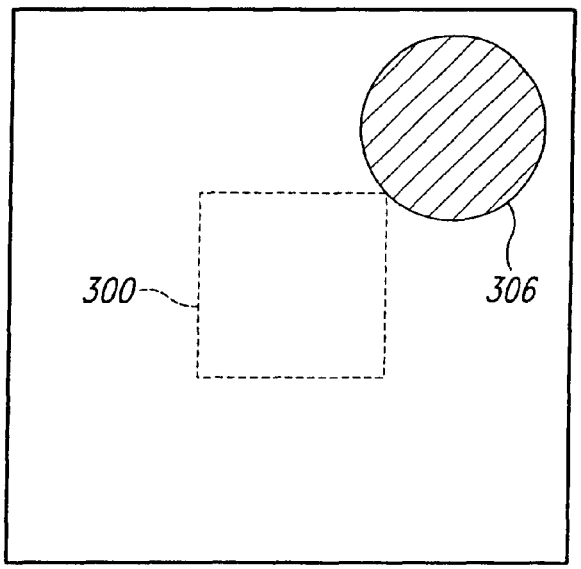
FIG. 9B is a plan view showing movement of the pupil shadow in response to eye movement.

As shown in FIG. 9A, when the user's eye is positioned so that light from the fiber 74 and source 292 enters the pupil 265 (i.e., when the eye is positioned as shown in FIG. 7), a central region 300 of the detector 288 receives a low level of light from the eye coupling optics 102. The area of low light resulting from the viewer's pupil 265 will be referred to herein as the pupil shadow 306. When the eye 252 shifts to the position shown in FIG. 8, the pupil shadow 306 shifts relative to the detector 288 as shown in FIG. 9B. In response the detector 288 outputs data that are indicative of the position of the pupil shadow 306. The data are input to an electronic position controller 308, such as a microprocessor or application specific integrated circuit (ASIC). Responsive to the data, the position controller 308 accesses a look up table in a memory device 310 to retrieve positioning data indicating an appropriate positioning correction for fiber 74 relative to the eye 108. The positioning data may be determined empirically or may be calculated based upon known geometry of the eye 108 and the scan head 64.

In response to the retrieved positioning data, the position controller 308 activates X and Y drivers 312, 314 to provide voltages to respective piezoelectric positioners 316, 318 coupled to the substrate 285. As is known, piezoelectric materials deform in the presence of electrical fields, thereby converting voltages to physical movement. Therefore, the applied voltages from the respective drivers 312, 314 cause the piezoelectric positioners 316, 318 to move the end of the fiber 74 and the source 292 along X and Y axes.

Figure 1:
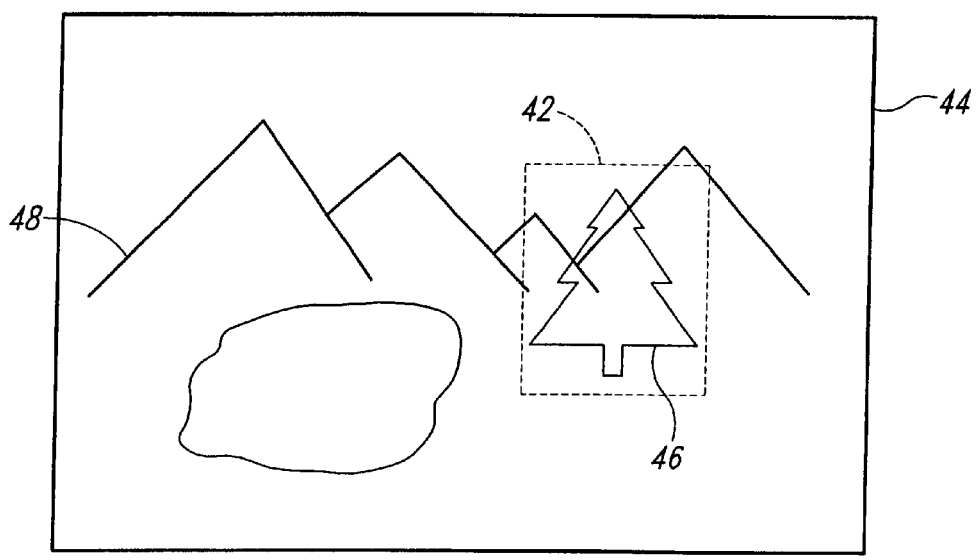
FIG. 1 is a diagrammatic representation of a combined image perceived by a user resulting from the combination of light from an image source and light from a background.
Figure 11:
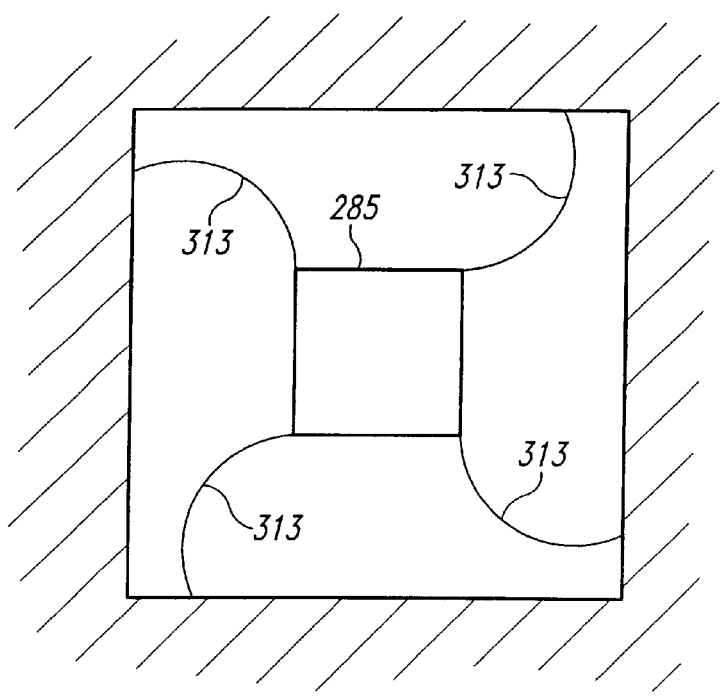
FIG. 11 is plan view of an optical source mounted with a shape memory alloy.
Figure 10:
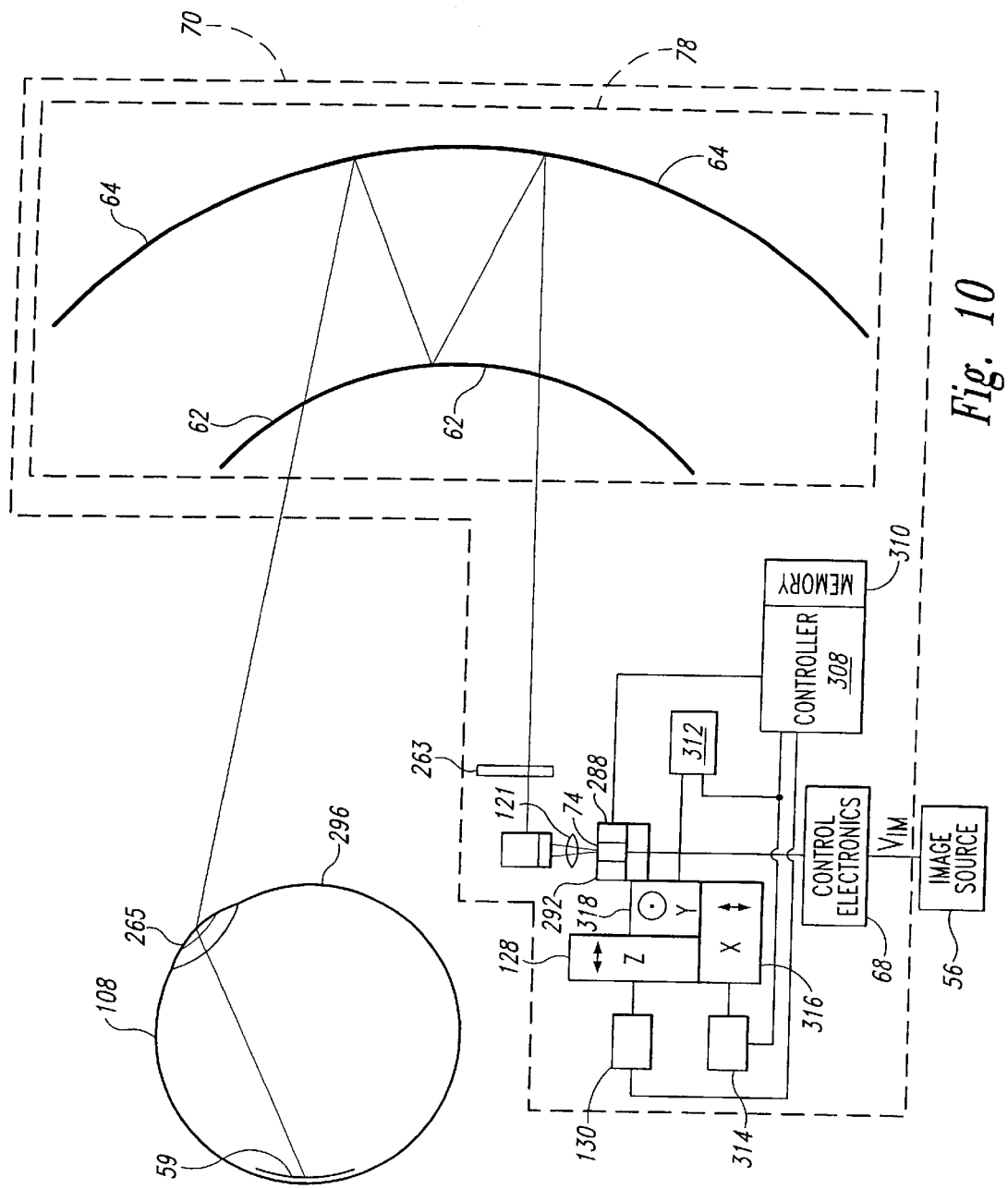
FIG. 10 is a diagrammatic representation of the scanning display of FIG. 8 showing movement of the eye pupil relative to the scanned beam.

As shown in FIG. 10, shifting the positions of the fiber 74 and source 292 shifts the locations at which light from the fiber 74 and source 292 strikes the viewer's eye, so that the light once again enters the pupil 265. The pupil shadow 306 once again returns to the position shown in FIG. 9A. One skilled in the art will recognize that the deformation of the piezoelectric positioner 316 is exaggerated in FIG. 10 for demonstrative purposes. However, because the mirrors 262, 264 may have a magnification greater than one, small shifts in the position of the substrate 285 can produce larger shifts in the location at which the light from the fiber 74 arrives at the eye 108. Thus, the piezoelectric positioners 312, 314 can produce sufficient beam translation for many positions of the eye. Where even larger beam translations are desirable, a variety of other types of positioners, such as electronic servomechanisms may be used in place of the piezoelectric positioners 312, 314. Alternatively, shape memory alloy-based positioners 313 can be used to reposition the substrate as shown in FIG. 11. Shape memory alloys are known materials, such as equiatomic nickel-titanium alloys, that change shape in response to energy inputs, such as heat induced by electrical currents. The positioners 313 may be spirally located, as shown in FIG. 11 or may be in any other appropriate configuration. One skilled in the art will also recognize that the eye coupling optics 102 does not always require magnification, particularly where the positioners 314, 316 are formed from a mechanism that provides relatively large translation of the scanner 270.

Figure 12:
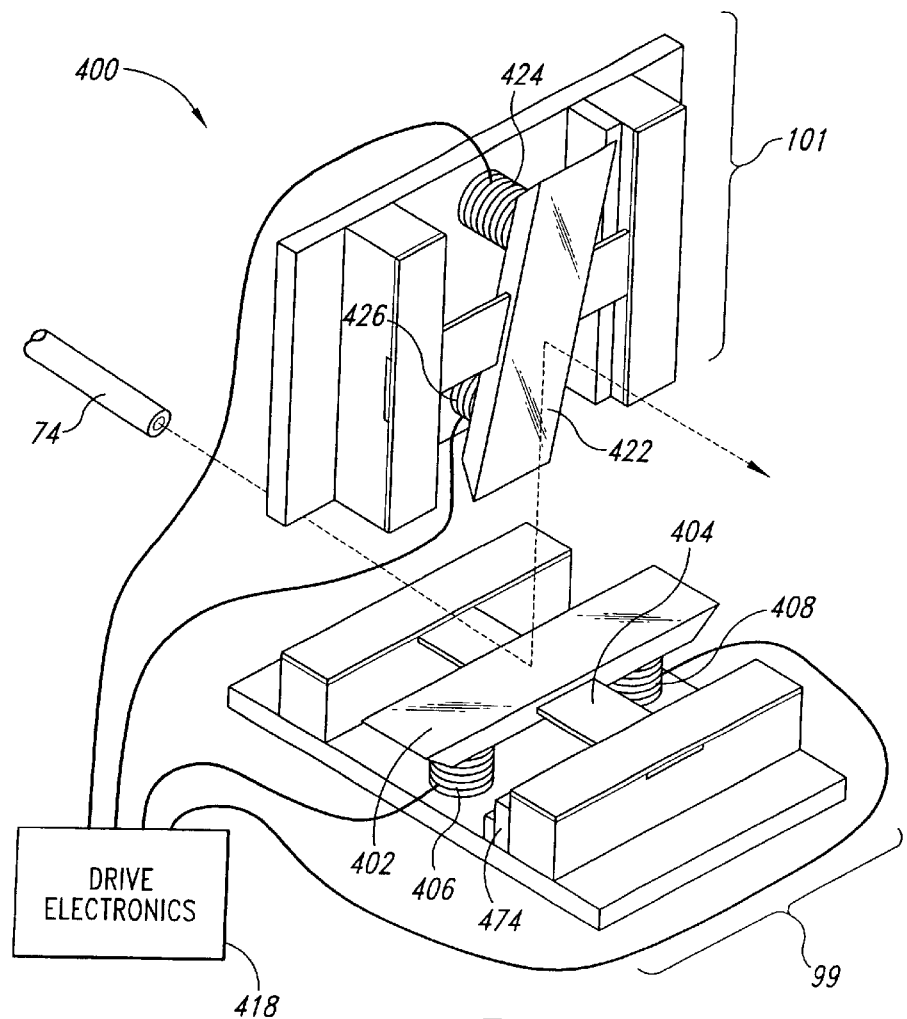
FIG. 12 is a diagrammatic representation of a scanning display suitable for use as one of the scanners of FIG. 2.

FIG. 12 shows one embodiment of a mechanically resonant scanner 400 suitable for use as the scanning assembly 99. The horizontal scanner 99 that includes a moving mirror 402 mounted to a spring plate 404. The dimensions of the mirror 402 and sping plate 404 and the material properties of the spring plate 404 are selected so that the mirror 402 and spring plate 404 have a natural oscillatory frequency on the order of 10–100 kHz. A ferromagnetic material mounted with the mirror 402 is driven by a pair of electromagnetic coils 406, 408 to provide motive force to mirror 402, thereby initiating and sustaining oscillation. Drive electronics 418 provide electrical signal to activate the coils 406, 408.

Vertical scanning is provided by the vertical scanner 101, which is structured very similarly to the horizontal scanner 99. Like the horizontal scanner 99, the vertical scanner 101 includes a mirror 422 driven by a pair of coils 424, 426 in response to electrical signals from the drive electronics 418. However, because the rate of oscillation is much lower for vertical scanning, the vertical scanner 101 is typically not resonant. The mirror 422 receives light from the horizontal scanner 99 and produces vertical deflection at about 30–100 Hz. Advantageously, the lower frequency allows the mirror 422 to be significantly larger than the mirror 402, thereby reducing constraints on the positioning of the vertical scanner 420.

An example of one such resonant scanner suitable for use in the display 260 is found in U.S. Pat. No. 5,557,444 of Melville, et al entitled MINIATURE OPTICAL SCANNER FOR A TWO-AXIS SCANNING SYSTEM which is incorporated herein by reference. Alternatively, the scanning system includes a biaxial scanner, such as that described in U.S. Pat. No. 5,629,790 to Neukermans et al, entitled MICROMACHINED TORSIONAL SCANNER which is also incorporated herein by reference. One skilled in the art will also recognize that other types of scanners, such as acousto-optically driven scanners, or spinning polygon-based scanners may also be within the scope of the invention.

For scanning, the fiber 74 outputs light obtained by scanning the input scene. At the same time, the drive electronics 418 activate the coils 406, 408, 424, 426 to oscillate the mirrors 402, 422. The light strikes the oscillating horizontal mirror 402, and is deflected horizontally by an angle corresponding to the instantaneous angle of the mirror 402. The deflected light then strikes the vertical mirror 422 and is deflected at a vertical angle corresponding to the instantaneous angle of the vertical mirror 422. Displays employing scanned beams imaged upon a retina and mechanical resonant scanning are described in greater detail in U.S. Pat. No. 5,467,104, of Furness III, et al. entitled VIRTUAL RETINAL DISPLAY, which is also incorporated herein by reference.

Figure 13:
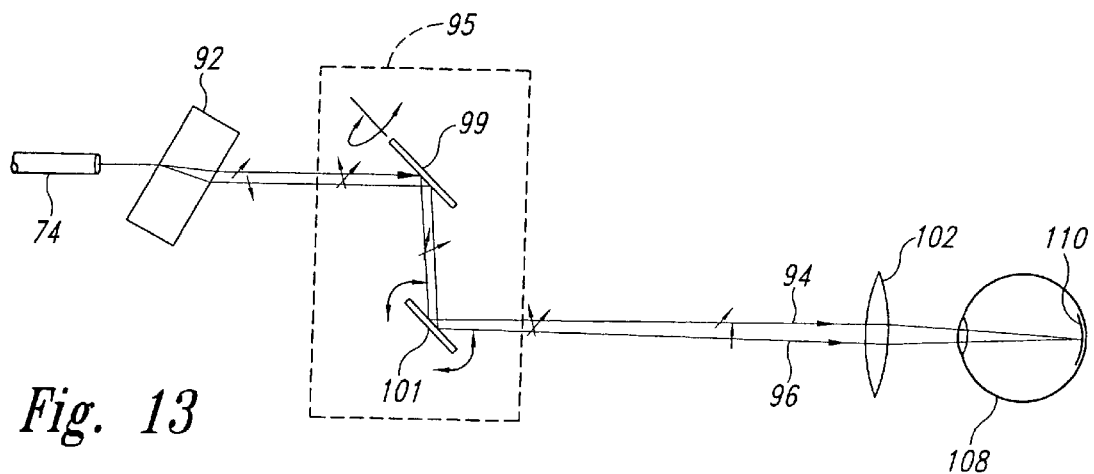
FIG. 13 is a diagrammatic display of a scan head showing separation of polarized beams from a fiber into separate, spaced apart beams before the beams enter the scanning assembly.

The previously described embodiments have included a birefringent crystal 92 positioned after the scanning assembly 95. However, as shown in FIG. 13, the beams can be separated before they enter the scanning assembly 95. In this embodiment, light exiting the fiber 74 enters the birefringent crystal 92 where the polarized components are separated. To produce a slight angular difference between the beams, the birefringent crystal 92 may be a non-rectangular shape with opposite faces that are not parallel. After exiting the crystal 92, the beams enter the scanning assembly 95 where they are redirected at angles determined by the vertical and horizontal scanners 99, 101. The eye coupling optics 102 then couple the light into the eye 108. Because the beams arrive at the eye at slightly different angles, the user perceives the light as originating at different locations in the image field. Consequently, the beams can produce two pixels substantially simultaneously.

Although the inventions herein have been presented through exemplary embodiments, one skilled in the art will recognize that various modifications can be made to the exemplary embodiments without departing from the scope of the invention. For example, the data handling structure described herein can be modified to accommodate various forms of input data. Similarly, in some a applications, the horizontal scanner 99 may be non-resonant. Also, although the is canners are described herein as being formed from bulk materials, one or both of the scanners may be realized as microelectromechanical devices (MEMs). Moreover, although a birefringent crystal 92 is used to separate the polarized components of the light, one skilled in the art will recognize that other devices could be used to separate the beams. For example, polarization-dependent diffractive optical components or integrated optical components can also separate the light. Accordingly, the invention herein is not limited except as defined by the appended claims.

What is claimed is:

1. A method of producing an image for viewing by a user, comprising the steps of:

emitting first and second beams of light at a first location;

separately modulating each of the first and second beams according to respective portions of the image;

establishing a nonzero polarization difference between each of the first and second beams;

jointly transmitting the first and second beam through a fiber from the first location to the second location;

at the second location, separating the first and second beams in response to the polarization difference; and at the second location, scanning the first and second beams through a predetermined pattern to define the image.

2. The method of claim 1 further comprising the step of outputting the beam from the fiber before separating the first and second beams in response to the polarization difference.

3. The method of claim 1 wherein the step of emitting first and second beams at a first location includes the steps of:
   emitting a single beam with a light emitter; and
   splitting the single beam into the first and second beams at the first location.

4. The method of claim 1 wherein the polarization difference is approximate 90 degrees, such that the first and second beams are polarized orthogonally.

5. The method of claim 1 wherein the step of separately modulating each of the first and second beams includes the steps of:
   receiving an image signal containing information relating to a plurality of lines of the image;
   segmenting the information into segments, where each segment corresponds to one or more of the lines of the image;
   modulating the first beam in response to a first of the segments; and
   modulating the second beam in response to a second of the segments different from the first of the segments.

6. A method of producing an image of a remote location for viewing by a user, comprising the steps of:
   decoding image information at a first location separate from the remote location to produce a plurality of sets of modulation signals;
   producing a first modulated beam having a first beam modulation corresponding to a first of the modulation signals, the first modulated beam further having a first polarization;
   producing a second modulated beam having a second beam modulation corresponding to a second of the modulation signals, the second beam having a second polarization different from the first polarization;
   transmitting the first and second modulated beams from the first location to the remote location with an optical fiber;
   maintaining the relative polarizations of the first and second modulated beams while transmitting through the fiber;
   outputting the first and second beams from the fiber;
   separating the output beams in response to the polarizations of the beams; and
   simultaneously scanning the first and second beams through a predetermined pattern to produce the image.

7. The method of claim 6 wherein the step of separating the output beams in response to the polarizations of the beams includes the step of passing the output beams through a birefringent material.

8. The method of claim 7 wherein the polarization difference is approximate 90 degrees, such that the first and second beams are polarized orthogonally.

9. The method of claim 6 wherein the step of producing a first modulated beam having a first beam modulation corresponding to a first of the modulation signals, the first modulated beam further having a first polarization includes the steps of:
   emitting a single beam with a light emitter;
   forming the first beam from a portion of the emitted beam; and
   modulating the formed first beam.

10. The method of claim 9 wherein the step of producing a second modulated beam having a second beam modulation corresponding to a second of the modulation signals includes the steps of:
    forming the second beam from a portion of the single beam by splitting the single beam into the first and second beams at the first location; and
    modulating the second beam separately from the first beam.

11. The method of claim 10 wherein the step of modulating the second beam follows the step of rotating the polarization of the second beam.

12. The method of claim 9 wherein the step of producing a second modulated beam having a second beam modulation corresponding to a second of the modulation signals, the second beam having a second polarization different from the first polarization, includes the step of rotating the polarization of the second beam.

13. The method of claim 12 wherein the polarization difference is approximate 90 degrees, such that the first and second beams are polarized orthogonally.

14. The method of claim 6 wherein the step of emitting first and second beans at a first location includes the steps of:
    emitting the first input beam from a first light emitter; and
    emitting the second input beam from a second light emitter.

15. The method of claim 6 further comprising the steps of:
    receiving an image signal containing information relating to a plurality of lines of the image;
    segmenting the information into segments, where each segment corresponds to one or more of the lines of the image; and
    wherein the step of producing a first modulated beam having a first beam modulation corresponding to a first of the modulation signals, the first modulated beam further having a first polarization is responsive to a first of the segments and the step of producing a second modulated beam having a second beam modulation corresponding to a second of the modulation signals, the second beam having a second polarization different from the first polarization is responsive to a second of the segments.

* * * * *